UNITED STATES PATENT OFFICE.

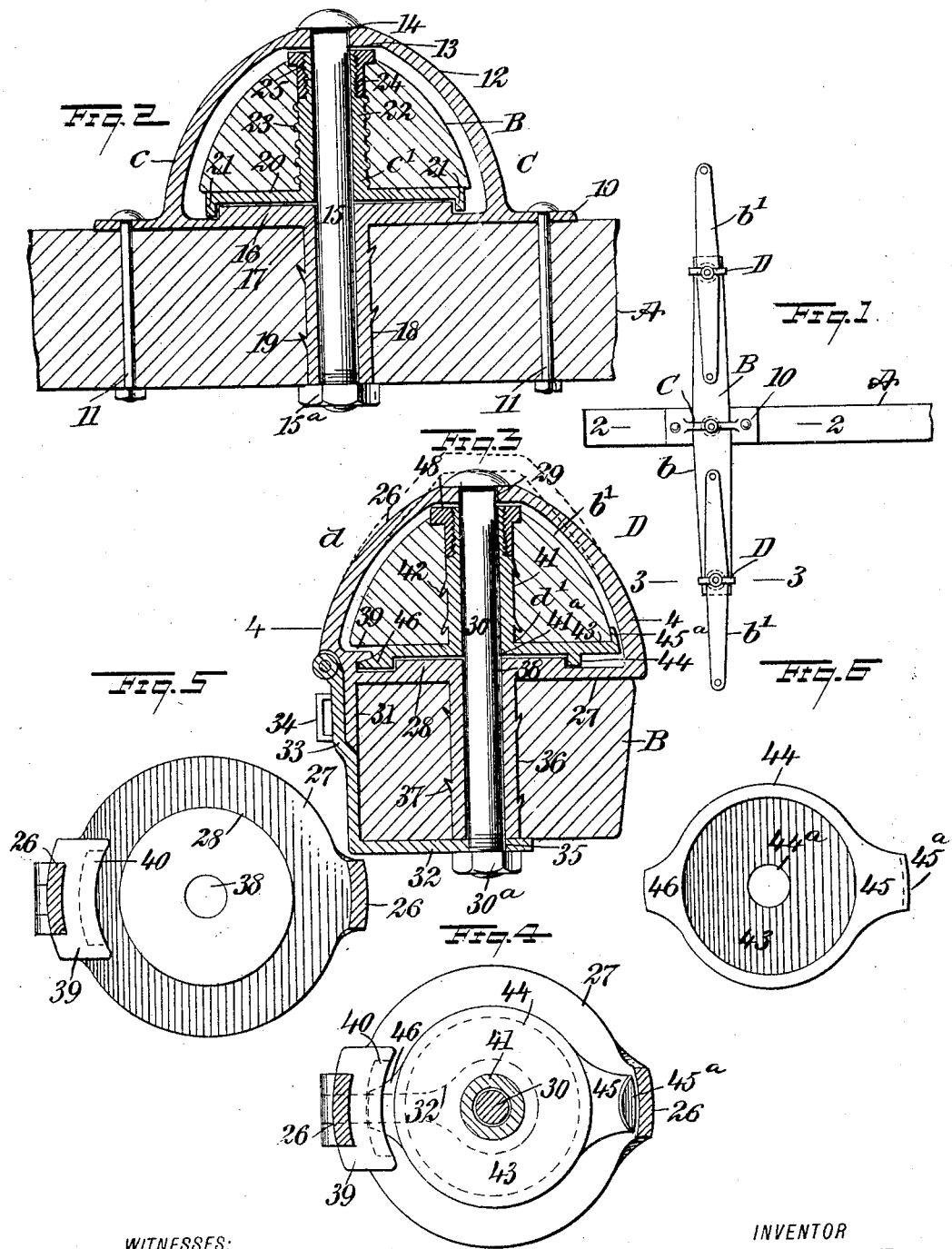

GEORGE LOUIS MILLER, OF SOCIALVILLE, OHIO.

WHIFFLETREE-COUPLING.

No. 803,353.　　　　Specification of Letters Patent.　　　　Patented Oct. 31, 1905.

Application filed September 30, 1904. Serial No. 226,649.

*To all whom it may concern:*

Be it known that I, GEORGE LOUIS MILLER, a citizen of the United States, and a resident of Socialville, in the county of Warren and State of Ohio, have invented a new and Improved Whiffletree-Coupling, of which the following is a full, clear, and exact description.

The purpose of my invention is to provide a simple, durable, and economic form of swingle and double tree irons adapted especially for pivotally connecting the doubletree of a whiffletree to the pole or tongue of a vehicle and also for pivotally connecting the swingletrees to a doubletree; but the couplings may be employed with equally good results in connection with kindred articles.

Another purpose of the invention is to construct couplings capable of being readily and conveniently applied to the articles upon which they are to be used and to so construct the couplings that straps may be connected with a doubletree to limit its movement and, further, so that the couplings designed to connect swingletrees and doubletrees will be provided with integral means for limiting the movements of the swingletrees.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view, on a small scale, of a portion of a vehicle tongue or pole and a whiffletree and the improved couplings applied. Fig. 2 is an enlarged sectional view taken practically on the line 2 2 of Fig. 1. Fig. 3 is an enlarged sectional view taken substantially on the line 3 3 of Fig. 1. Fig. 4 is a sectional plan view of the coupling shown in Fig. 3, the section being taken practically on the line 4 4 of Fig. 3. Fig. 5 is a sectional plan view of the coupling shown in Fig. 3 and that portion which is carried by the doubletree, the section of the coupling carried by the swingletree having been removed and the section being taken substantially on the same line as that indicated in Fig. 4; and Fig. 6 is a bottom plan view of that section of the coupling designed for attachment to a swingletree.

A represents the tongue or pole of a vehicle to which the whiffletree B is shown applied, the whiffletree comprising, as usual, the doubletree $b$ and the swingletrees $b'$. The doubletree $b$ is pivotally attached to the tongue or pole by means of a coupling C, and the pivotal connection is effected between the swingletrees and the doubletree by means of couplings D, which are practically of the same construction as the coupling C, differing only therefrom in minor details.

With reference to the coupling C employed for attaching the doubletree to the pole or tongue of the vehicle, said coupling is shown in detail in Fig. 2 and is constructed in two sections—namely, a fixed section $c$, which is adapted for positive attachment to the tongue or pole A, and a second section $c'$, adapted for attachment to the doubletree $b$. The section $c$, carried by the tongue or pole A, consists of a base-plate 10, fastened by bolts 11 or othwise to the pole or tongue A, and an arched member 12 is sprung upward from the said base-plate, connecting therewith at points near its ends about centrally between its side edges, as is shown in Fig. 1, and the inner face 13 of the arched member 12 at its upper portion is substantially flat, as is shown in Fig. 2, and this portion of the arched member 12 is provided with an aperture 14, usually polygonal, being adapted to receive the polygonal upper or headed end of a bolt 15, adapted as the actual pivotal medium between the doubletree and the pole or tongue A.

A boss 16 is formed upon the upper face of the base-plate 10 about centrally with relation to the lower portion of the arched member 12, and in the central portion of this boss 16 an opening 17 is made, extending through the base-plate 10, and at the lower edge of the said opening 17 a sleeve 18 extends downwardly from the base-plate 10, the said sleeve being provided with upwardly-extending spurs 19 upon its outer face. This sleeve 18 is of such length that when the base-plate 16 of the fixed member $c$ of the coupling is secured to the upper face of the tongue or pole A said sleeve 18 extends through the tongue or pole A to its bottom face.

In applying the fixed member $c$ of the coupling to the tongue or pole A the sleeve 18 is driven downward into a suitable bore produced in the pole or tongue adapted to receive the said sleeve, and the spurs 19, carried by the sleeve 18, prevent the sleeve from drawing upward or outward from the said pole. The second section $c'$ of the coupling C, and which may be termed the "movable" section, is adapted for attachment to the central portion of the doubletree $b$, and this section $c'$ consists of a base-plate 20, provided with a downwardly-extending marginal flange 21, and said base-plate 20 is of a size corresponding to that of the boss 16 of the fixed section $c$ of the coupling, and the flange 21 from the base-plate 20 extends down at the marginal portion of the said boss when the two coupling-sections are in place.

A sleeve 22 extends upward from the central portion of the base-plate 20 of the said movable section $c'$ of the coupling, communicating with a suitable opening in the central portion of the base-plate 20. This sleeve 22 is provided with an exterior coarse thread 23 and has an upper exteriorly-reduced and exteriorly-threaded portion 24, adapted to receive a nut 25, the upper face of which nut is flat, and its upper marginal portion is polygonal in order that the said nut may be readily tightened or loosened by means of a wrench or the like.

The sleeve 22 of the coupling-section $c'$ is screwed into a suitable opening made in the doubletree $b$, the base-plate 20 engaging with the under face of the said doubletree, and then the cap-nut 25 is screwed to place. Finally, the bolt 15, heretofore mentioned, is passed down through the opening 14 in the arched member 12 and through the sleeve 22 and likewise through the sleeve 18 of the fixed section $c$ of the coupling, and at the lower end of the bolt 15 a nut $15^a$ is screwed, so as to draw the bolt downward and hold the doubletree in proper pivotal relation to the tongue or pole A.

The castings are preferably made of malleable iron, so that the arched member $c$ may be pressed downward when the bolt 15 is tightened up, and in placing the doubletree in position its coupling portion is first slipped within the arched member 12 before the bolt 15 is passed through the two sections of the coupling.

Relative to the coupling D employed for connecting the swingletrees $b'$ to the doubletree $b$ this coupling is shown in its entirety in Fig. 3 and in detail in Figs. 4, 5, and 6. This coupling D consists of a fixed section $d$ and a movable section $d'$, as is particularly shown in Fig. 3. The fixed section $d$ consists of a base-plate 27, which is adapted to rest upon the upper face of the doubletree $b$ near one end, and an arched member 26, corresponding to the arched member 12 of the coupling C. This arched member 26 is provided with an opening 29 at its upper end adapted to receive the polygonal-headed end portion of a bolt 30, which is otherwise round. This bolt 30 passes through an opening 38, made in the central portion of the base-plate and likewise in a circular boss 28, which is produced upon the upper central portion of said base-plate 27. In the further construction of the fixed section $d$ of the coupling D a brace-finger 31 is carried downward from the base-plate 27 at the rear of the said plate, and where the said finger connects with the arched member 26 the two parts are forwardly curved, so as to form knuckles for the hinged connection of the upper end of an angular stirrup 32 with the rear lower portion of the said arched member 26. The vertical or rear member of the stirrup 32 is offset rearwardly to accommodate the brace-finger 31, the offset portion of the stirrup 32 being designated as 33, and at this offset portion 33 of said stirrup a loop 34 is formed, adapted to receive a strap which being carried rearward to any portion of the pole or the running-gear of the vehicle will serve to limit the swinging movement of the doubletree. The horizontal or lower member of the stirrup 32 is carried to an engagement with the bottom face of the doubletree $b$ and is provided with an aperture 35 for the outward passage of the lower end of the bolt 30. A sleeve 36 is carried downward from the central portion of the base-plate 27, which sleeve is located around the lower end of a central opening $41^a$, made in the said base-plate 27, and the said sleeve 36 is provided with upwardly-extending exterior spurs 37. The formation of the fixed section $d$ of the coupling is completed by locating a socket member 39 at the rear lower portion of the arched member 26. This socket member 39 extends forwardly over the rear portion of the base-plate 27 and is provided with a segmental pocket 40, best shown by dotted lines in Fig. 5, which pocket faces the boss 28. The movable section $d'$ of the said coupling consists of a sleeve 41, which is adapted to pass through the central portion of a swingletree $b'$, and this sleeve 41 is provided with downwardly-extending exterior spurs 42, and said sleeve 41 is integral with or is attached to a base-plate 43, having a central opening $41^a$ therein registering with the bore of the sleeve 41, and this base-plate 43 is provided with an annular flange 44 at its bottom face. From the said flange 44 a forwardly-extending lip 45 is carried, having an upwardly-extending member $45^a$, and from the rear central portion of the said base-plate 43 a lug 46 is rearwardly carried so shaped as to enter and freely turn in the pocket 40 of the guide or socket plate 39. The upper end portion of the sleeve 41 is exteriorly reduced and exteriorly threaded to receive a cap-nut 48, corresponding to the cap-nut 25, described with relation to the coupling C.

In assembling the parts of the coupling D the base-plate 27 of the fixed section is made to rest upon the upper face of the doubletree $b$, and the sleeve 36 is forced down into a suitable bore made in the said doubletree, as shown in Fig. 3, and then the stirrup 32 is carried to the lower position. (Shown in the same figure.) Next the movable section $d'$ is secured to the swingletree $b'$ by driving the sleeve 41 up into the said swingletree at its center until its base-plate 43 engages with the bottom of the swingletree. Then the cap-nut 48 is placed in position. Next the swingletree is passed through the arched member 26 of the fixed section $d$ until the back lug 46 has entered the pocket 40 in the socket or guide plate 39, as is also shown in Fig. 3, and the upwardly-extending section $45^a$ of the lip 45 will engage with the front portion of the swingletree, serving to brace the said tree at that point. Finally, the bolt 30 is passed through the opening 29 in the arched member of the fixed section $d$, thence downward through the sleeve 41 of the movable section $d'$, and then down through the sleeve 36 of the fixed section $d$, the nut $30^a$ being screwed upon the lower end of the bolt.

The above-mentioned manipulations of the draft-tree can be readily brought about and the various parts of the coupling may be readily assembled by means of the arched members 12 and 26 being made of malleable iron or other yielding metal and of much greater size than actually needed when in operation, as is shown by dotted lines in Fig. 3. In fact, the arched member of the coupling is initially of such size as to permit the ready passage of the draft-tree and attached parts adapted to coact with the arched member, and when the parts of the coupling have been assembled they are drawn together, and the arched member is compressed in an inward direction by means of the applied bolt 15 and accompanying nut $15^a$.

Having thus described my invention, I claim as new and desire to secure by Letters Patent—

1. A whiffletree-coupling comprising an arched member provided with a tubular extension from its base, having exterior spurs for the attachment of the pole or tongue, a movable member having rotatable guided movement in the arched member, a tubular extension from the movable member, adapted to register with the tubular extension from the arched member, the extension from the movable member being adapted for attachment to a draft-tree and passing through the arched member, and a pivot-pin passed through the said tubular members, which pivot-pin is provided with means for forwardly compressing the arched member.

2. In a whiffletree-coupling, a fixed section comprising a base-plate having a central circular boss and a sleeve extending downward from the boss, registering with an aperture in the said base-plate and boss, and an arched member extending from the base-plate at opposite sides of the boss, a movable section adapted for attachment to an object to be pivoted, which movable section consists of a base-plate having a lower marginal flange extending to the marginal section of the said boss, a sleeve extending upward from the said base-plate, means for locking the sleeves of the two sections in their positions, and a pivot-bolt passed through the said sleeves and through the said arched member.

3. In a whiffletree-coupling, the combination with a support and a coupling-section comprising a base-plate engaging with the upper face of the support, a sleeve extending from the base-plate through the said support, a boss centrally formed upon the upper face of the base-plate, an arched member extending from the base-plate at opposite sides of the boss, and a guide-plate provided with a pocket, extending forwardly from the rear lower portion of the arched member, of a second support adapted for movement within the said arched member, and a coupling-section adapted for attachment to the said movable support, the said section comprising a base-plate having a lower marginal flange encircling the said boss and a rearwardly-extending lug entering the pocket in the guide-plate, a sleeve extending upward from the said plate, carrying the said lug, and a pivot-pin passed through the sleeves of the two sections and the said arched member of the first-named section.

4. In a whiffletree-coupling, the combination with a support and a coupling-section comprising a base-plate engaging with the upper face of the support, a sleeve extending from the base-plate through said support, a boss centrally formed upon the upper face of the base-plate, an arched member extending from the base-plate at opposite sides of the boss, and a guide-plate provided with a pocket, extending forwardly from the rear lower portion of the arched member, of a second support adapted for movement within the arched member, and a coupling-section adapted for attachment to said movable support, said section comprising a base-plate having a lower marginal flange encircling said boss and a rearwardly-extending lug entering the pocket in the guide-plate, a sleeve extending upward from the base-plate, carrying the said lug, and a pivot-pin passed through the sleeves of the two sections and the said arched member of the first-named section, a stirrup having hinged connection with said arched member, which stirrup extends beneath the support to which the first-named section is applied, said stirrup being locked in position on the said pivot-bolt, and a guide-finger extending downward from the base-plate of the first-named section, which finger is in engagement with the said stirrup, as described.

In testimony whereof I have signed my name to this specification in the presence of two subscribing witnesses.

GEORGE LOUIS MILLER.

Witnesses:
J. LEE THOMPSON,
WM. DONSON.